US012043099B1

(12) United States Patent
Hayes et al.

(10) Patent No.: US 12,043,099 B1
(45) Date of Patent: Jul. 23, 2024

(54) AXLE ASSEMBLY HAVING A SHIFT MECHANISM

(71) Applicant: ArvinMeritor Technology, LLC, Troy, MI (US)

(72) Inventors: Brian Hayes, Troy, MI (US); David M. Zueski, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 18/479,183

(22) Filed: Oct. 2, 2023

(51) Int. Cl.
*B60K 1/00* (2006.01)
*B60K 17/16* (2006.01)
*B60K 17/04* (2006.01)

(52) U.S. Cl.
CPC .............. *B60K 1/00* (2013.01); *B60K 17/165* (2013.01); *B60K 2001/001* (2013.01); *B60K 17/043* (2013.01)

(58) Field of Classification Search
CPC .. B60K 1/00; B60K 2001/001; B60K 17/043; B60K 17/08; F16H 2200/0021; F16H 2702/04
See application file for complete search history.

(56) References Cited

U.S. PATENT DOCUMENTS

| 1,981,236 | A | 11/1934 | Logue |
| 6,176,146 | B1 | 1/2001 | Ore |
| 7,798,937 | B2 | 9/2010 | Gitt |
| 9,719,563 | B2 | 8/2017 | Hirao |
| 10,591,037 | B2 * | 3/2020 | Eschenburg ............ F16H 48/05 |
| 10,975,942 | B1 * | 4/2021 | Soffner .................... B60K 1/00 |
| 10,989,288 | B1 | 4/2021 | Ghatti et al. |
| 11,168,783 | B1 | 11/2021 | Cradit et al. |
| 11,207,976 | B2 | 12/2021 | Ghatti et al. |
| 11,209,072 | B2 | 12/2021 | Ghatti et al. |
| 11,220,176 | B1 | 1/2022 | Cradit et al. |
| 11,441,644 | B2 | 9/2022 | Ghatti et al. |
| 11,441,657 | B2 | 9/2022 | Chandrashekar et al. |
| 2011/0111910 | A1 | 5/2011 | Ideshio et al. |
| 2014/0311266 | A1 | 10/2014 | Nakashima et al. |
| 2017/0059007 | A1 | 3/2017 | Eo et al. |
| 2018/0015816 | A1 | 1/2018 | Robinette et al. |
| 2018/0112770 | A1 | 4/2018 | Hansson et al. |
| 2019/0054816 | A1 | 2/2019 | Garcia et al. |
| 2019/0054817 | A1 | 2/2019 | Garcia et al. |
| 2019/0054818 | A1 | 2/2019 | Garcia et al. |
| 2020/0173494 | A1 | 6/2020 | Smith et al. |
| 2020/0173531 | A1 | 6/2020 | Smith |
| 2020/0173535 | A1 | 6/2020 | Peng et al. |
| 2020/0173537 | A1 | 6/2020 | Begov et al. |
| 2020/0173541 | A1 | 6/2020 | Soffner et al. |
| 2020/0177049 | A1 | 6/2020 | Raya et al. |
| 2020/0177059 | A1 | 6/2020 | Smith et al. |
| 2022/0316590 | A1 | 10/2022 | Chandrashekar et al. |

FOREIGN PATENT DOCUMENTS

| DE | 102013108416 A1 * | 2/2015 | .............. B60K 1/00 |
| DE | 102021208061 A1 * | 2/2023 | |

* cited by examiner

*Primary Examiner* — Sherry L Estremsky
(74) *Attorney, Agent, or Firm* — Brooks Kushman PC

(57) ABSTRACT

An axle assembly having a shift mechanism and a drive pinion. The shift mechanism includes a shift collar, a linkage, and an actuator. The linkage is coupled to the shift collar. The actuator is coupled to the linkage. The linkage is received in a drive pinion hole of the drive pinion.

27 Claims, 10 Drawing Sheets

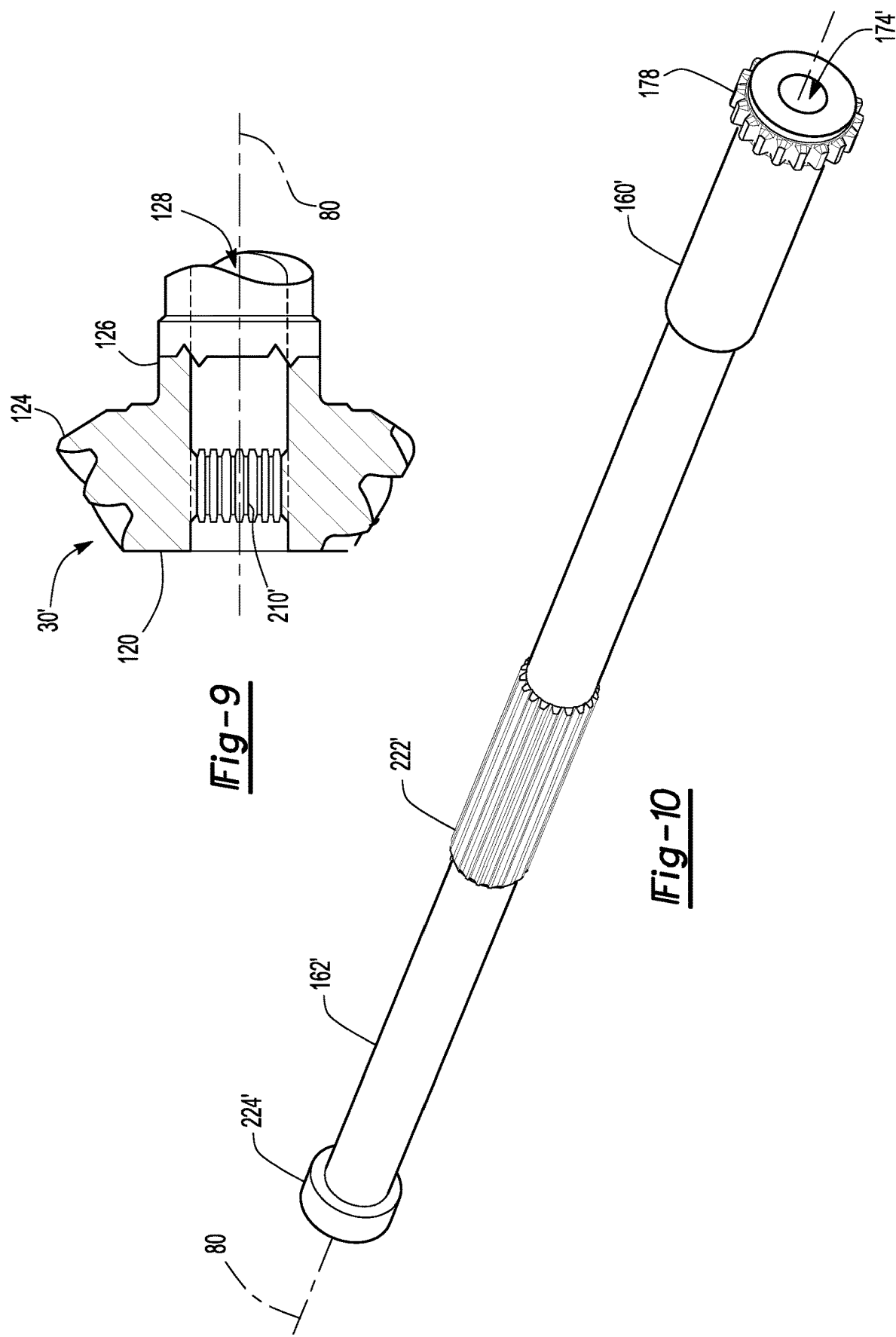

AXLE ASSEMBLY HAVING A SHIFT MECHANISM

TECHNICAL FIELD

The invention relates to an axle assembly that has a shift mechanism.

BACKGROUND

An axle assembly having a shift mechanism is disclosed in U.S. Pat. No. 11,441,657.

SUMMARY

The invention relates to an axle assembly. The axle assembly includes a drive pinion, a transmission, and a shift mechanism. The drive pinion is rotatable about an axis. The drive pinion has a drive pinion hole. The drive pinion hole extends along the axis. The drive pinion hole extends from a first end of the drive pinion toward a second end of the drive pinion. The second end of the drive pinion is disposed opposite the first end. The transmission comprises a set of gears. The shift mechanism includes a shift collar, a linkage, and an actuator. The shift collar is rotatable about the axis with the drive pinion. The shift collar is moveable along the axis with respect to the drive pinion. The linkage is coupled to the shift collar. The linkage is received in the drive pinion hole of the drive pinion. The actuator is coupled to the linkage. The actuator is configured to move the linkage and the shift collar along the axis to selectively connect a member of the set of gears to the drive pinion.

The linkage may extend along the axis. The linkage may be rotatable about the axis with the shift collar. The linkage may be disposed inside the shift collar. The linkage may be fixedly coupled to the shift collar.

The drive pinion may include a drive pinion extension. The drive pinion extension may be rotatable about the axis. The shift collar may be disposed on the drive pinion extension. The linkage may be received inside the drive pinion extension.

The drive pinion extension may have a slot. The slot may extend in an axial direction with respect to the axis. A fastener may be received in the slot. The fastener may couple the linkage to the shift collar. The fastener may be fixedly coupled to the linkage and the shift collar. The fastener may be moveable in the slot in the axial direction.

The linkage, the fastener, and the shift collar may move along the axis in a first direction when the actuator moves the shift collar toward the actuator. The linkage, the fastener, and the shift collar may move along the axis in a second direction that is disposed opposite the first direction when the actuator moves the shift collar away from the actuator.

The axle assembly may include an end cover. The end cover may be disposed at an end of the axle assembly. The end cover may define a pocket. A support bearing may be received inside the pocket. The support bearing may rotatably support the drive pinion. The fastener may be received in the pocket.

The axle assembly may have an electric motor. The electric motor may include a rotor. The rotor may be rotatable about the axis. The rotor may encircle the drive pinion. The drive pinion may encircle the linkage.

The axle assembly may include an axle housing and a differential carrier. The axle housing and the differential carrier may cooperate to define an internal cavity. The differential assembly may be received inside the internal cavity. The actuator may be received inside the internal cavity. The actuator may be mounted to the differential carrier. The actuator may be mounted to the axle housing.

The differential assembly may be rotatable about a differential axis. The actuator may be axially positioned with respect to the axis between the first end of the drive pinion and the differential axis.

The actuator may be positioned further from the drive pinion than the differential axis is positioned from the drive pinion.

The actuator may be disposed outside of the internal cavity. The actuator may be mounted to the axle housing.

The actuator may be disposed along the axis.

The drive pinion may be rotatably coupled to the linkage. The linkage may be rotatable about the axis with the drive pinion. The linkage may be moveable along the axis with respect to the drive pinion.

The drive pinion may be rotatably coupled to the linkage in the drive pinion hole. The drive pinion and the linkage may be rotatably coupled with mating splines.

A support shaft may extend along the axis. The support shaft may be encircled by the linkage. The support shaft may be encircled by the shift collar. The support shaft may be rotatable about the axis. The linkage may be rotatable about the axis with the support shaft.

BRIEF DESCRIPTION OF THE DRAWINGS

FIG. 9 is a section view of a portion of the drive pinion that may be provided with the axle assembly of FIG. 8.

FIG. 10 is a side view of a shift collar and linkage shown in FIG. 8.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
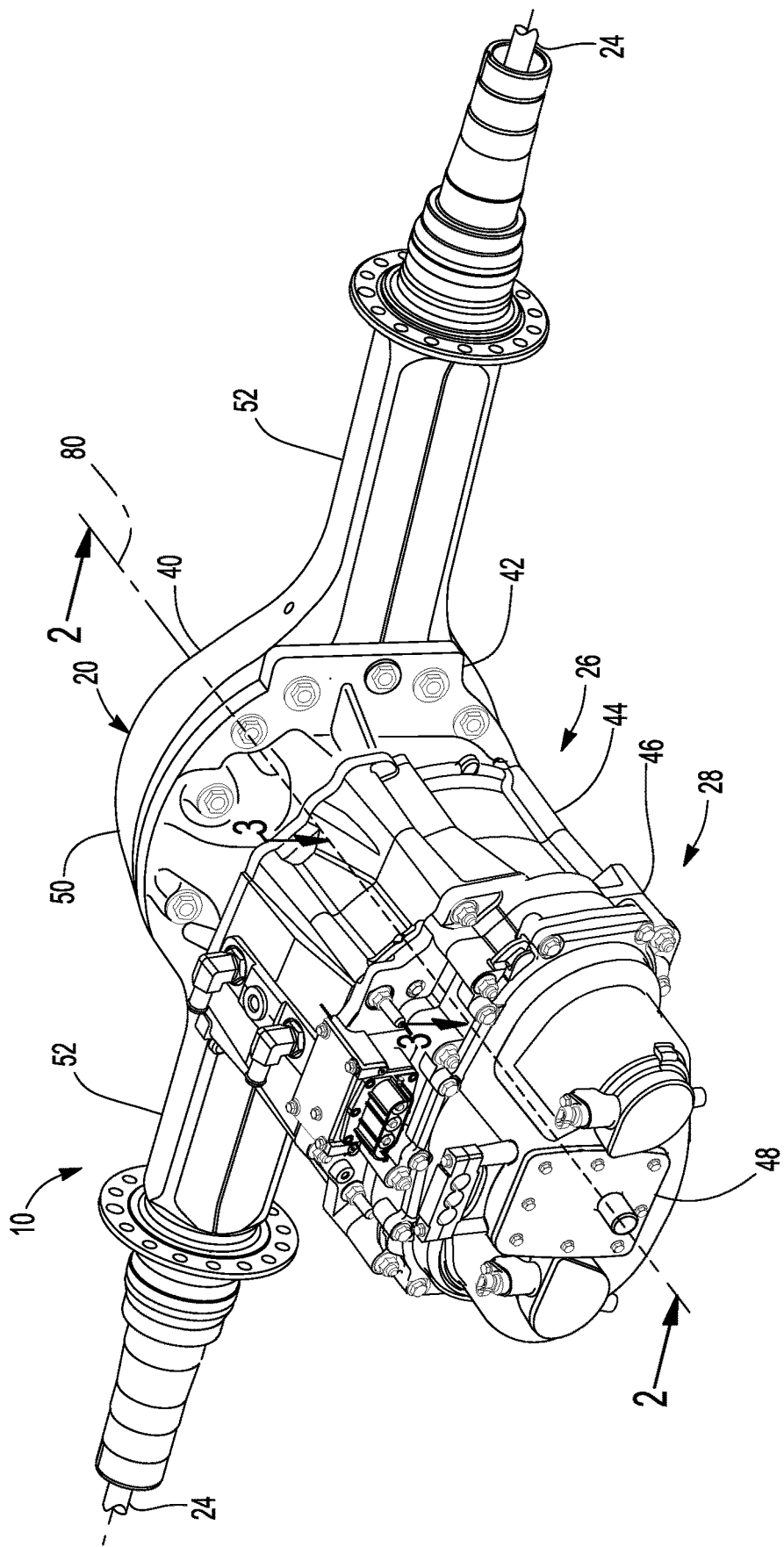
FIG. 1 is a perspective view of an example of an axle assembly.

Referring to FIG. 1, an example of an axle assembly 10 is shown. The axle assembly 10 may be provided with a motor vehicle like a truck, farm equipment, military transport or weaponry vehicle, or cargo loading equipment for land, air, or marine vessels. The vehicle may include a trailer for transporting cargo in one or more embodiments.

The axle assembly 10 is a drive axle assembly. A drive axle assembly is configured to provide torque to one or more wheel assemblies. A wheel assembly may be rotatably supported on the axle assembly 10. A wheel assembly may include a tire disposed on a wheel. The wheel may be mounted to a wheel hub that may be rotatable about a wheel axis. The wheel hub may be rotatably disposed on the axle assembly 10.

In some configurations, an axle assembly 10 includes a housing assembly 20, a differential assembly 22, a pair of axle shafts 24, an electric motor 26, a transmission 28, a drive pinion 30, and a shift mechanism 32. The positioning of the differential assembly 22, the electric motor 26, and/or the transmission 28 may differ from that shown. For instance, the differential assembly 22 may be positioned between the electric motor 26 and the transmission 28. It is also contemplated that the electric motor 26 may be remotely positioned from the axle assembly 10 and may not be part of the axle assembly 10 in some configurations. For illustration purposes, the axle assembly 10 will be primarily described in the context of the configuration shown in FIGS. 1-3.

Referring to FIG. 1, the housing assembly 20 receives various components of the axle assembly 10. In addition, the housing assembly 20 may facilitate mounting of the axle assembly 10 to the vehicle. In some configurations, the housing assembly 20 includes an axle housing 40 and a differential carrier 42. In some configurations, the housing assembly 20 includes an electric motor housing 44, a transmission housing 46, an end cover 48, or combinations thereof.

Figure 2:
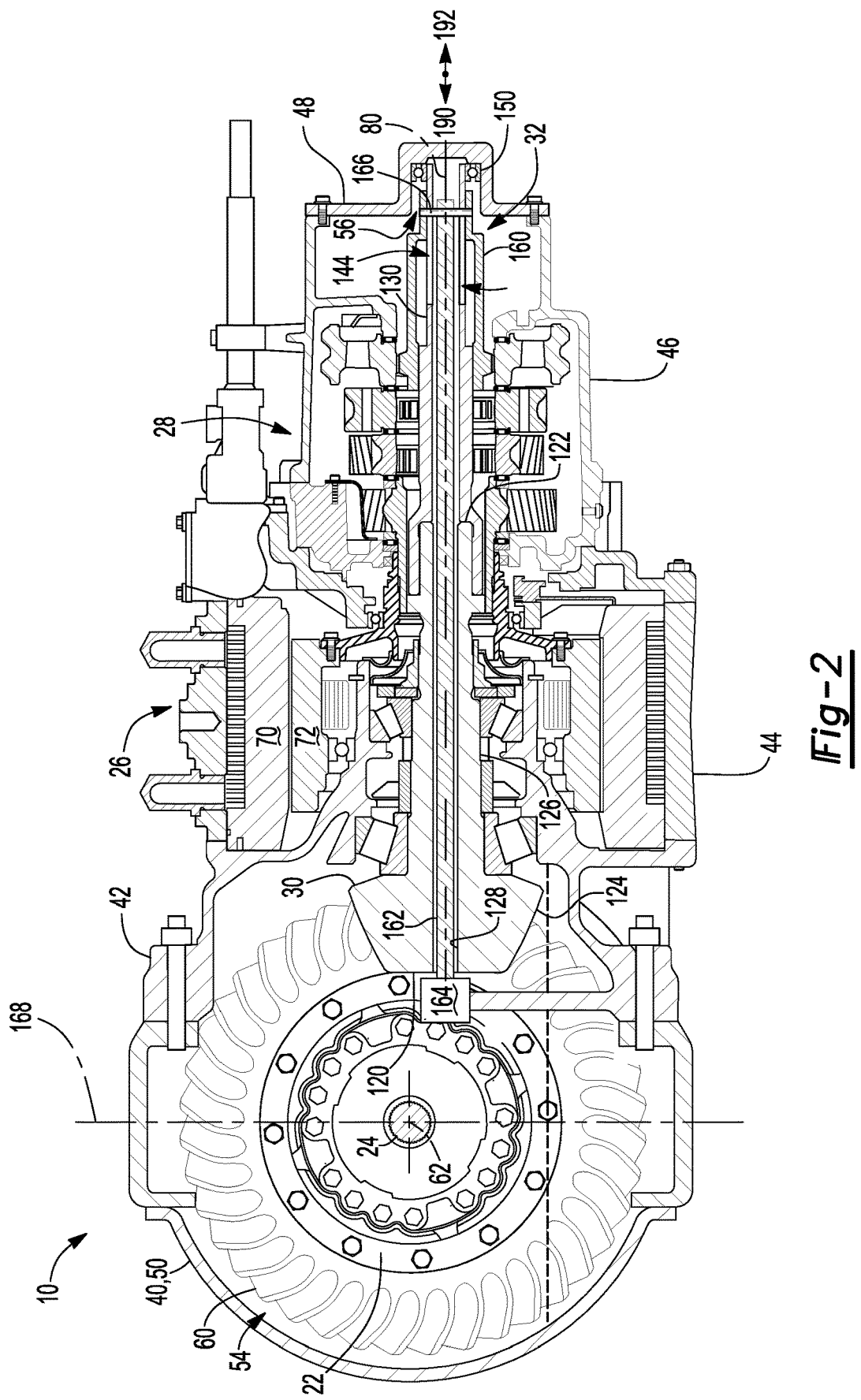
FIG. 2 is a section view of the axle assembly along section line 2-2.

Referring to FIGS. 1 and 2, the axle housing 40 may receive and support the axle shafts 24. The axle housing 40 may include a center portion 50 and at least one arm portion 52.

The center portion 50 may be disposed proximate the center of the axle housing 40. The center portion 50 may help define an internal cavity 54 that may receive the differential assembly 22.

One or more arm portions 52 may extend from the center portion 50. For example, two arm portions 52 may extend in opposite directions from the center portion 50 and away from the differential assembly 22. The arm portions 52 may each have a hollow configuration or tubular configuration that may extend around and may receive a corresponding axle shaft 24 and may help separate or isolate the axle shaft 24 from the surrounding environment. A wheel hub may be rotatably disposed on an arm portion 52 and may be connected to an axle shaft 24.

The differential carrier 42 is configured to be mounted to the axle housing 40. For instance, the differential carrier 42 may be mounted to the center portion 50 of the axle housing 40. The differential assembly 22 may be rotatably supported on the differential carrier 42. The differential carrier 42 and the axle housing 40 may cooperate to define the internal cavity 54.

The electric motor housing 44 may extend around or encircle the electric motor 26. In some configurations, the electric motor housing 44 extends between the differential carrier 42 and the transmission housing 46.

The transmission housing 46 may extend around or encircle the transmission 28. In some configurations, the transmission housing 46 extends between the electric motor housing 44 and the end cover 48.

The end cover 48 may be disposed at an end of the housing assembly 20. For instance, the end cover 48 may be mounted to an end of the transmission housing 46 that faces away from the differential assembly 22. The end cover 48 may define a pocket 56, which is best shown in FIG. 2. The pocket 58 may be disposed along an axis 80 about which the drive pinion 30 is rotatable as will be discussed in more detail below.

Referring to FIG. 2, the differential assembly 22 is disposed in the housing assembly 20. For instance, the differential assembly 22 may be disposed in the internal cavity 54. The differential assembly 22, which may also be called an axle differential, may transmit torque to the axle shafts 24 of the axle assembly 10 and permit the axle shafts 24 and wheel assemblies to rotate at different velocities in a manner known by those skilled in the art. For example, the differential assembly 22 may have a ring gear 60 that may be fixedly mounted to a differential case. The ring gear 60 and the differential case are rotatable about a differential axis 62. The differential case may receive differential gears that may be operatively connected to the axle shafts 24.

The axle shafts 24 are configured to transmit torque between the differential assembly 22 and a corresponding wheel hub. For example, two axle shafts 24 may be provided such that each axle shaft 24 extends through a different arm portion 52 of axle housing 40. The axle shafts 24 may be rotatable about a wheel axis. The wheel axis may be the same as the differential axis 62 or may differ from the differential axis 62.

The electric motor 26 is configured to provide torque, such as propulsion torque or regenerative braking torque. Propulsion torque may be used to propel the vehicle, such as in a forward or backward direction. Propulsion torque may also be used to hold the vehicle in a stationary position or to help reduce, limit, or prevent vehicle rollback, such as when the vehicle is on an inclined surface. Regenerative braking may provide a regenerative braking torque. Regenerative braking may capture kinetic energy when the electric motor 26 is used to brake or slow the velocity of the vehicle. Recovered energy may be transmitted from the wheel assemblies to drive the electric motor 26. Thus, the electric motor 26 may function as a generator and may be used to charge an electric power source, such as a battery. The electric motor 26 may be electrically connected to the electric power source via an inverter in a manner known by those skilled in the art.

The electric motor 26 includes a stator 70 and a rotor 72. The stator 70 may be fixedly positioned with respect to the electric motor housing 44. The stator 70 may encircle the rotor 72. The rotor 72 is rotatable about an axis 80 with respect to the stator 70. The rotor 72 may encircle the drive pinion 30. The electric motor 26 may be mounted to or positioned inside of the housing assembly 20, such as inside the electric motor housing 44.

The transmission 28 facilitates the transmission of torque between the electric motor 26 and the drive pinion 30. Torque transmission may be bidirectional. The transmission 28 may provide gear reduction and multiple gear ratios between the rotor 72 and the drive pinion 30. The transmission 28 may be of any suitable type. For instance, the transmission 28 may be a countershaft transmission, an epicyclic transmission (e.g., a transmission having a planetary gear set), or the like. A countershaft transmission may include a single countershaft or multiple countershafts. Examples of an axle assembly having a single countershaft transmission are disclosed in U.S. Pat. Nos. 11,002,352 and 11,209,072. Examples of an axle assembly having a dual countershaft transmission is disclosed in in U.S. Pat. Nos. 10,989,288, 11,207,976, and 11,220,176. Examples of an axle assembly having an epicyclic transmission are disclosed in U.S. Pat. Nos. 11,038,396 and 11,428,297. The disclosures of the references in the preceding three sentences are hereby incorporated in their entirety by reference herein.

Figure 3:
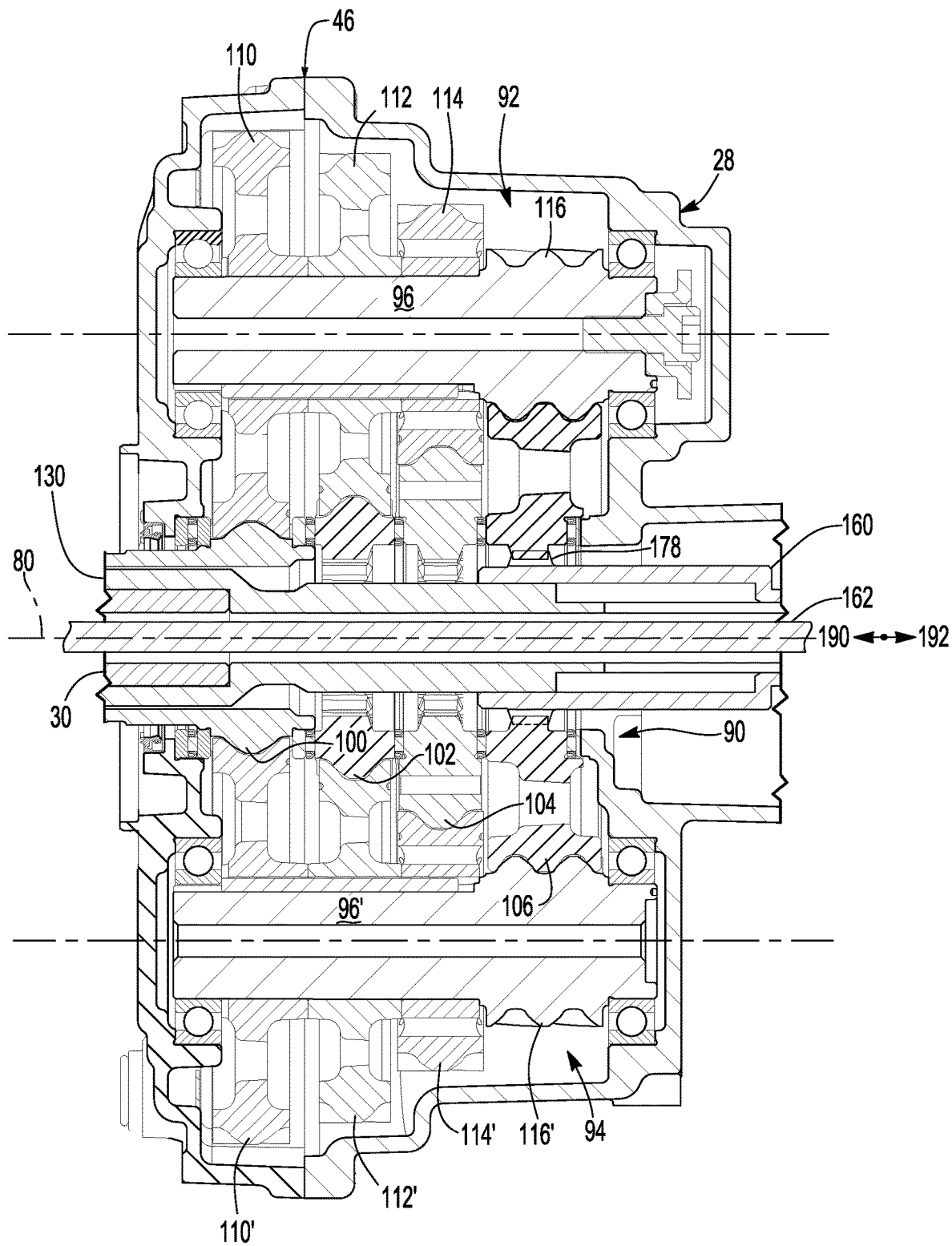
FIG. 3 is a section view of a portion of the axle assembly along section line 3-3 with the electric motor module omitted for clarity.

An example of a transmission 28 that is configured as a dual countershaft transmission is shown in FIGS. 2 and 3. However, it is to be understood that the transmission 28 is not limited to a countershaft transmission and may be of any suitable type as discussed above. The transmission 28 includes one or more sets of gears. For instance, in the configuration shown in FIG. 3, the transmission 28 may include a set of drive pinion gears 90, a first countershaft gear set 92, and a second countershaft gear set 94. Gears of the first and second countershaft gear sets 92, 94 may be disposed on and rotatable with first and second countershafts 96, 96', respectively. The second countershaft gear set 94 may be omitted in a single countershaft configuration. The set of drive pinion gears 90, first countershaft gear set 92, and second countershaft gear set 94, may be replaced with one or more epicyclic or planetary gear sets in other configurations.

In FIG. 3, set of drive pinion gears 90 may include a plurality of gears, some or all of which may be selectively coupled to the drive pinion 30. The gears may be independently rotatable with respect to each other. In the configuration shown, the set of drive pinion gears 90 includes a first gear 100, a second gear 102, a third gear 104, and a fourth gear 106; however, it is to be understood that a greater or lesser number of gears may be provided. The first gear 100 may mesh with one or more first countershaft gears 110, 110'. The second gear 102 may mesh with one or more second countershaft gears 112, 112'. The third gear 104 may mesh with one or more third countershaft gears 114, 114'. The fourth gear 106 may mesh with one or more fourth countershaft gears 116, 116'.

Referring to FIG. 2, the drive pinion 30 operatively connects the transmission 28 to the differential assembly 22. As such, the drive pinion 30 may transmit torque between the differential assembly 22 and the transmission 28. The drive pinion 30 is rotatable about the axis 80. The drive pinion 30 is disposed inside the housing assembly 20 and may be rotatably supported on the differential carrier 42 via one or more roller bearing assemblies. The drive pinion 30 has a first end 120, a second end 122, a gear portion 124, a shaft portion 126, and a drive pinion hole 128. The drive pinion 30 may also include a drive pinion extension 130.

The first end 120 faces toward the differential assembly 22. The first end 120 may be part of the gear portion 124.

The second end 122 is disposed opposite the first end 120. As such, the second end 122 may face away from the differential assembly 22. The second end 122 may be part of the shaft portion 126.

The gear portion 124 includes a plurality of teeth that mate with corresponding teeth on the ring gear 60 of the differential assembly 22. The gear portion 124 may be disposed at or near an end of the shaft portion 126. The gear portion 124 may be integrally formed with the shaft portion 126 or may be provided as a separate component that may be fixedly disposed on the shaft portion 126.

The shaft portion 126 extends from the gear portion 124. For instance, the shaft portion 126 may extend from the gear portion 124 to the second end 122. The shaft portion 126 may extend along or about the axis 80.

The drive pinion hole 128 is disposed in the drive pinion 30. The drive pinion hole 128 extends along the axis 80. The drive pinion hole 128 extends from the first end 120 toward the second end 122. In some configurations, the drive pinion hole 128 is a through hole. For instance, the drive pinion hole 128 may extend along the axis 80 from the first end 120 of the drive pinion 30 to the second end 122 of the drive pinion 30. The drive pinion hole 128 may have any suitable configuration. For instance, the drive pinion hole 128 may have a circular cross-section.

Figure 4:
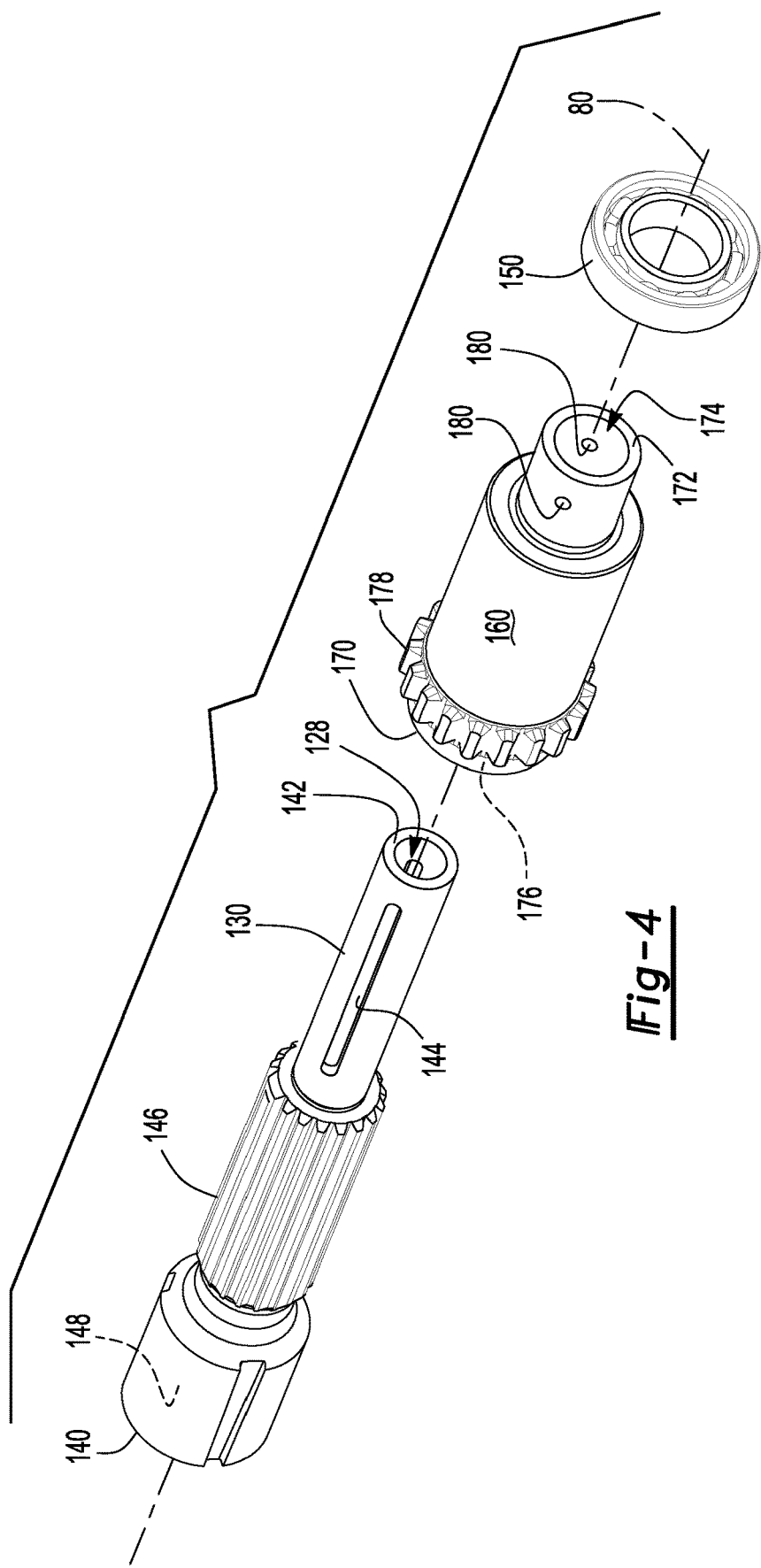
FIG. 4 is an exploded view of examples of a drive pinion extension, shift collar, and support bearing that may be provided with a shift mechanism of the axle assembly.

Referring to FIGS. 2-4, the drive pinion extension 130 increases the axial length of the drive pinion 30. For instance, the drive pinion extension 130 may be a separate component that is mounted to the shaft portion 126 such that the drive pinion extension 130 is rotatable about the axis 80 with the shaft portion 126. For example, the drive pinion extension 130 may be mounted to the shaft portion 126 with mating splines. The drive pinion extension 130 may extend from the second end 122 of the drive pinion 30 in a direction that extends away from the gear portion 124. The drive pinion extension 130 may be fixedly positioned with respect to the drive pinion 30 such that the drive pinion extension 130 may not move along the axis 80 with respect to the shaft portion 126. It is also contemplated that the drive pinion extension 130 may be integrally formed with the drive pinion 30. For convenience in reference, the term "drive pinion" is used herein to refer to the drive pinion 30 with or without the drive pinion extension 130 unless otherwise specified.

Referring primarily to FIG. 4, the drive pinion extension 130, if provided, defines a portion of the drive pinion hole 128. In some configurations, the drive pinion extension 130 has a first extension end 140, a second extension end 142, one or more slots 144, and a spline 146. Optionally, the drive pinion extension 130 may include a socket 148.

The first extension end 140 faces toward the shaft portion 126 of the drive pinion 30. The first extension end 140 may be omitted if the drive pinion extension 130 is integrally formed with the drive pinion 30 as a unitary one-piece component.

The second extension end 142 is disposed opposite the first extension end 140. As such, the second extension end 142 faces away from the differential assembly 22. The portion of the drive pinion hole 128 that is disposed in the drive pinion extension 130 may extend from the first extension end 140 toward the second extension end 142 or to the second extension end 142. The second extension end 142 may be received inside and may be rotatably supported by a support bearing 150 that rotatably supports the drive pinion extension 130. The support bearing 150 may be received in the pocket 56 of the end cover 48 as shown in FIG. 2.

Referring to FIGS. 2 and 4, one or more slots 144 may be provided with the drive pinion extension 130. A slot 144 may extend or be elongated in an axial direction with respect to the axis 80 or in a direction that extends along or parallel to the axis 80. A slot 144 may be a closed end slot that extends between a first slot end and a second slot end. The slot 144 may extend from the drive pinion hole 128 away from the axis 80. For instance, the slot 144 may extend from the drive pinion hole 128 through the drive pinion extension 130 to an exterior surface of the drive pinion extension 130 that faces away from the axis 80. One slot 144 is visible in FIG. 4. Two slots 144 are visible in FIG. 2. These slots 144 are aligned with each other and disposed on opposite sides of the axis 80.

Referring primarily to FIG. 4, the spline 146 facilitates mounting and axial movement of a shift collar as will be discussed in more detail below. The spline 146 may include a plurality of teeth that extend from an exterior side of the drive pinion extension 130 in a direction that extends away from the axis 80 and the drive pinion hole 128. The spline 146 may be axially positioned between the first extension end 140 and the second extension end 142. For instance, the spline 146 may be axially positioned between the first extension end 140 and the slot 144.

The socket 148, if provided, receives the drive pinion 30. The socket 148 may extend from the first extension end 140. The first end 120 of the drive pinion 30 may be disposed inside the socket 148 when the drive pinion extension 130 is provided as a separate part. The drive pinion 30 may be fastened to the socket 148 in any suitable manner, such as with a fastener, threaded connection, mating splines, or the like. It is also contemplated that a socket 148 may be provided with the drive pinion 30 and that the drive pinion extension 130 may be received inside the socket.

Referring to FIG. 2, the shift mechanism 32 facilitates coupling of the drive pinion 30 to the transmission 28. For instance, the shift mechanism 32 is configured to selectively connect a gear of the transmission 28, such as a member of the set of drive pinion gears 90, to the drive pinion 30. The shift mechanism 32 may couple one gear at a time to the drive pinion 30. In some configurations, a gear that is coupled to the drive pinion 30 may be rotatable about the axis 80 with the drive pinion 30. The shift mechanism 32 may have any suitable configuration. In some configurations, the shift mechanism 32 includes a shift collar 160, a linkage 162, and an actuator 164. The shift mechanism 32 may also include a fastener 166.

The shift collar 160, which is best shown in FIG. 4, is rotatable about the axis 80 with the drive pinion 30. In addition, the shift collar 160 is moveable along the axis 80 with respect to the drive pinion 30. The shift collar 160 may selectively connect a gear of the transmission 28 to the drive pinion 30. For instance, the shift collar 160 may selectively connect a member of the set of drive pinion gears 90 to the drive pinion 30 as will be discussed in more detail below. In at least one configuration, the shift collar 160 may include a first end 170, a second end 172, a shift collar hole 174, a shift collar spline 176, and a shift collar gear 178.

The first end 170 may face toward the drive pinion 30. The first end 170 may encircle the axis 80.

The second end 172 is disposed opposite the first end 170. As such, the second end 172 may face away from the drive pinion 30.

The shift collar hole 174 extends along the axis 80 between the first end 170 to the second end 172. The shift collar hole 174 may be configured as a through hole that may extend from the first end 170 to the second end 172. The drive pinion 30 or the drive pinion extension 130 may be received inside the shift collar hole 174.

The shift collar spline 176 is configured to couple the shift collar 160 to the drive pinion 30, such as to the drive pinion extension 130 of the drive pinion 30. The shift collar spline 176 may be disposed in the shift collar hole 174. The shift collar spline 176 may include teeth that extend toward the axis 80. The shift collar spline 176 may mate with the spline 146. The mating splines may allow the shift collar 160 to move in an axial direction or along the axis 80 while limiting or inhibiting rotation of the shift collar 160 about the axis 80 with respect to the drive pinion 30. Thus, the shift collar 160 may be rotatable about the axis 80 with the drive pinion 30 when the shift collar spline 176 mates with the spline 146.

The shift collar gear 178 is engageable with a gear of the transmission 28. The shift collar gear 178 may be disposed between the first end 170 and the second end 172 of the shift collar 160. The shift collar gear 178 may be disposed opposite the shift collar hole 174. The shift collar gear 178 may have teeth that may be arranged around the axis 80 and that may extend away from the axis 80 and the shift collar hole 174.

Referring to FIG. 2, the linkage 162 operatively connects the shift collar 160 and the actuator 164. The linkage 162 is received in the drive pinion hole 128. As such, the linkage 162 may be received inside the drive pinion 30 and the drive pinion extension 130 if a drive pinion extension 130 is provided. The drive pinion 30, the drive pinion extension 130, or both may encircle the linkage 162. The linkage 162 may extend along the axis 80. The linkage 162 is coupled to the shift collar 160. As such, the linkage 162 may be rotatable about the axis 80 with the shift collar 160. The linkage 162 may be disposed inside the shift collar 160. The linkage 162 may be fixedly coupled to the shift collar 160. The linkage 162 may have any suitable configuration. For instance, the linkage 162 may be configured as a shaft, rod, or the like.

The actuator 164 is configured to move the shift collar 160 along the axis 80. For instance, the actuator 164 is configured to move the linkage 162 and the shift collar 160 along the axis 80 to selectively connect or selectively couple a gear of the transmission 28 to the drive pinion 30 or to decouple the shift collar 160 from a gear of the transmission 28. The actuator 164 is coupled to the linkage 162.

The actuator 164 may be provided in various locations. In some configurations, the actuator 164 is disposed in or received in the internal cavity 54 of the housing assembly 20. For instance, the actuator 164 may be disposed in the axle housing 40, in the differential carrier 42, or both. In the configuration shown in FIG. 2, the actuator 164 is disposed in the internal cavity 54 and in the differential carrier 42. The actuator 164 may be axially positioned with respect to the axis 80 between the first end 120 of the drive pinion 30 and the differential axis 62. For instance, the actuator 164 may be axially positioned along or with respect to the axis 80 between the first end 120 and a differential axis plane 168 that may be disposed substantially perpendicular to the axis 80. The term "substantially perpendicular" is used herein to designate features or axes that are the same as or very close to perpendicular and includes features that are within +3° of being perpendicular each other. In such a configuration, the actuator 164 may be mounted to the differential carrier 42.

Figure 6:
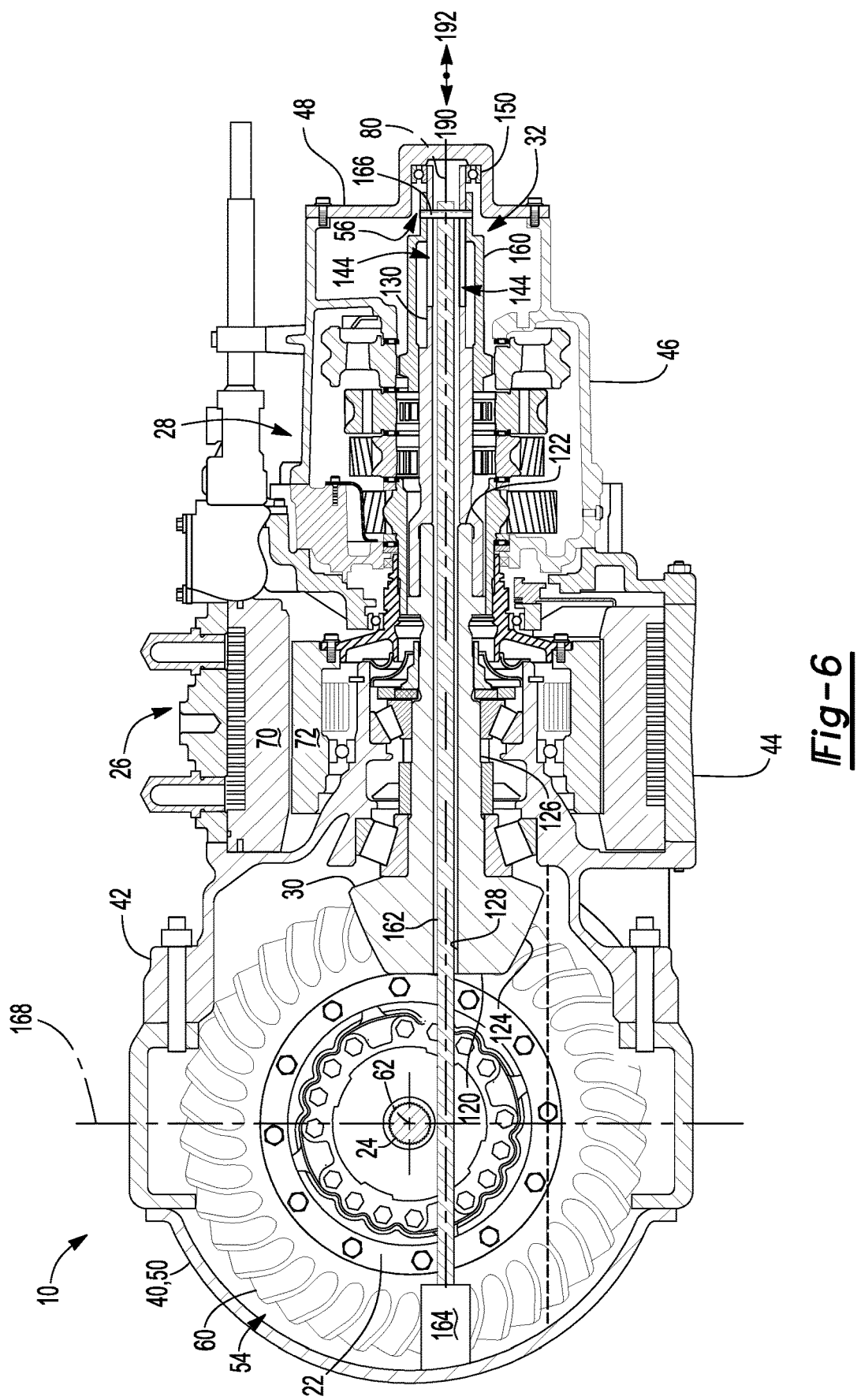
FIG. 6 is a section view of a second configuration of an axle assembly along section line 2-2.

In the configuration shown in FIG. 6, the actuator 164 is disposed further from the first end 120 of the drive pinion 30 than in the configuration shown in FIG. 2. For instance, the actuator 164 may be positioned further from the drive pinion 30 than the differential axis 62 is positioned from the drive pinion 30. For instance, the actuator 164 may be axially positioned along or with respect to the axis 80 between the differential axis plane 168 and the end or bowl cover of the axle housing 40 (e.g., the left end from the perspective shown in FIG. 2). In such a configuration, the actuator 164 may be disposed in the axle housing 40 and may be mounted to the axle housing 40.

Figure 7:
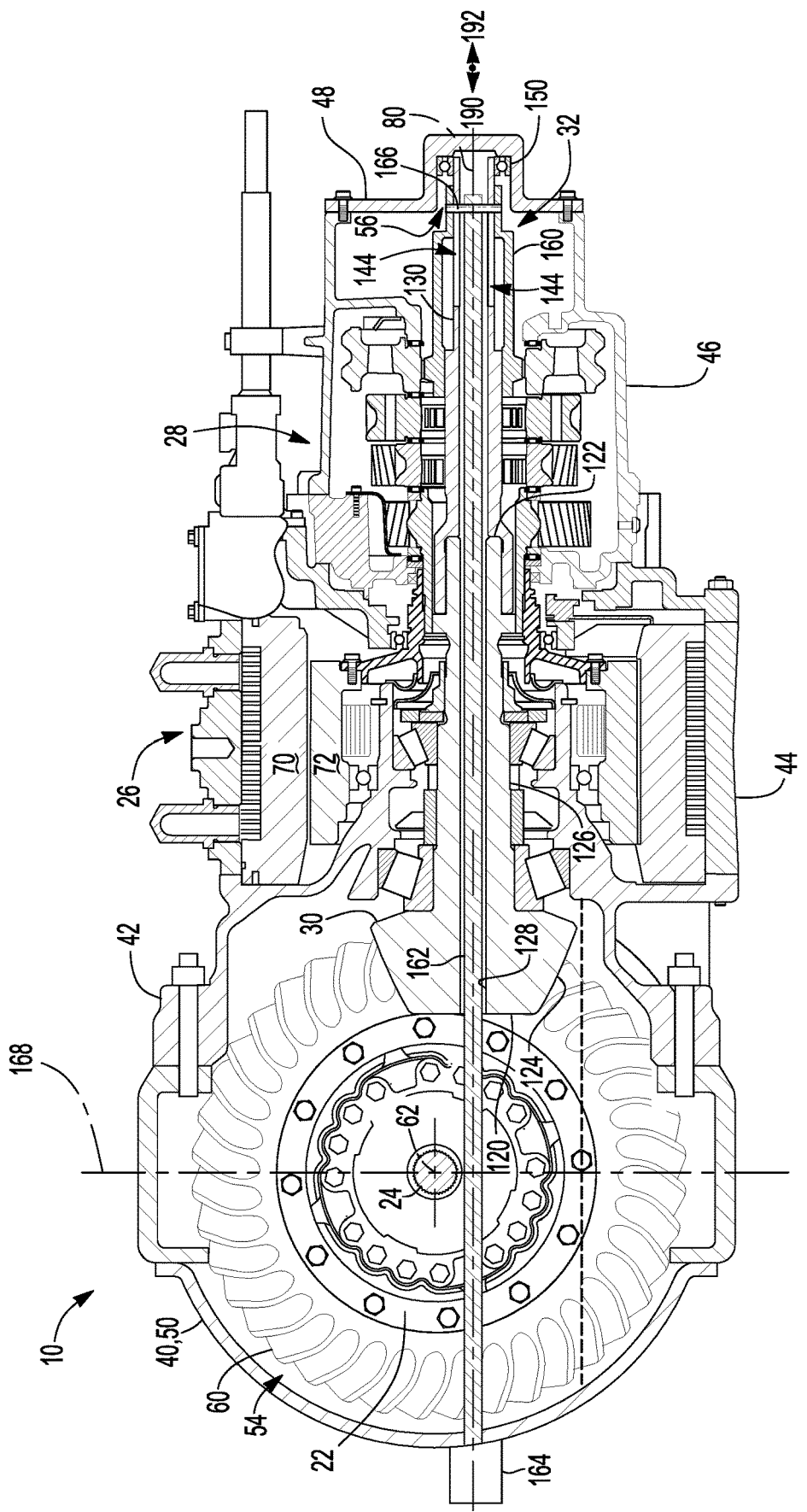
FIG. 7 is a section view of a third configuration of an axle assembly along section line 2-2.

In the configuration shown in FIG. 7, the actuator 164 is not disposed in or received in the internal cavity 54 of the housing assembly 20. Instead, the actuator 164 or a portion thereof may be disposed outside of the internal cavity 54. In FIG. 7, the actuator 164 is mounted to the axle housing 40 and is disposed outside of the axle housing 40. In such a configuration, the linkage 162 may extend through a hole in the end or bowl cover of the axle housing 40 to facilitate coupling to the actuator 164.

Referring primarily to FIG. 2, the fastener 166 couples the linkage 162 to the shift collar 160. The fastener 166 may be of any suitable type, such as a pin, dowel, threaded fastener, or the like. The fastener 166 may be fixedly coupled to the shift collar 160, the linkage 162, or both. For instance, the fastener 166 may protrude from the linkage 162 into one or more fastener holes 180, which are best shown in FIG. 4, in the shift collar 160. The fastener 166 may be received in the slot or slots 144 of the drive pinion 30 or drive pinion extension 130. As such, the fastener 166 may be moveable within the slot or slots 144 in an axial direction. In some configurations, the fastener 166 is receivable in the pocket 56 of the end cover 48, such as when the shift collar 160 is actuated away from the drive pinion 30.

The shift collar 160, the linkage 162, and the fastener 166 may be moveable together along the axis 80. The length of the slot 144 may limit the distance that the shift collar 160, the linkage 162, and the fastener 166 may move along the axis 80. For instance, axial movement of the shift collar 160, the linkage 162, and the fastener 166 may be inhibited when the fastener 166 engages or contacts a closed end of the slot 144.

The shift collar 160, the linkage 162, and the fastener 166 may be moveable along the axis 80 in a first direction 190 and in a second direction 192 that is disposed opposite the first direction 190. The shift collar 160, the linkage 162, and the fastener 166 may move along the axis 80 in the first direction 190 when the actuator 164 moves the shift collar 160 toward the actuator 164, or to the left from the perspective shown in FIGS. 2, 6, and 7. The shift collar 160, the linkage 162, and the fastener 166 may move along the axis 80 and the second direction 192 when the actuator 164 moves the shift collar 160 away from the actuator 164, or to the right from the perspective shown in FIGS. 2, 6, and 7.

Figure 5:
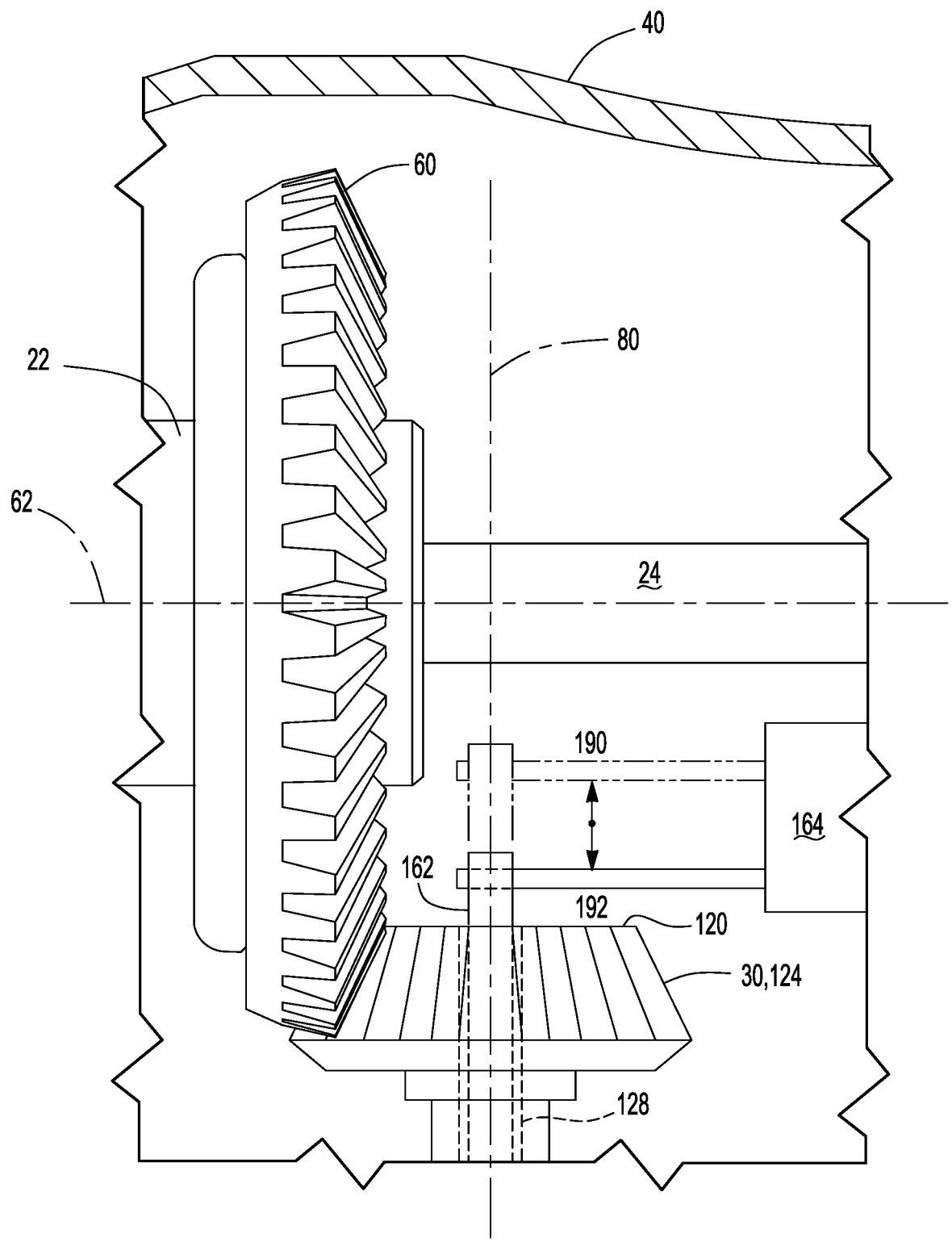
FIG. 5 is a fragmentary plan view of a portion of the axle assembly illustrating an example of an actuator of the shift mechanism offset from an axis of rotation of a drive pinion.

In the configurations shown in FIGS. 2, 6, and 7, the actuator 164 may or may not be disposed along or intersect the axis 80. An actuator 164 that is disposed along the axis 80 or that may intersect the axis 80 may be directly coupled to the linkage 162. As some nonlimiting examples, the actuator 164 may be a linear actuator or solenoid that may exert force on the linkage 162 to move the linkage 162 along the axis 80. Referring to FIG. 5, an example of a fragmentary plan view is shown that illustrates the actuator 164 being offset from and not intersected by the axis 80. In such a configuration, the actuator 164 may be coupled to the linkage 162 with a secondary linkage 200 that may connect the actuator to the linkage 162. The secondary linkage 200 may have any suitable configuration, such as a shaft, cable such as a push-pull cable, or the like.

The actuator 164 may move the secondary linkage 200, the linkage 162, and the shift collar 160 along the axis 80, which is represented in phantom in FIG. 5. Movement along the axis 80 to the left or in the first direction 190 from the position shown in FIGS. 2 and 4 may move the shift collar gear 178 out of engagement with the fourth gear 106 to a first neutral position that is disposed between the fourth gear 106 and the third gear 104. Further actuation in the first direction 190 may move the shift collar gear 178 into engagement with the third gear 104, followed by a second neutral position between the third gear 104 and the second gear 102, and into engagement with the second gear 102.

Figure 8:
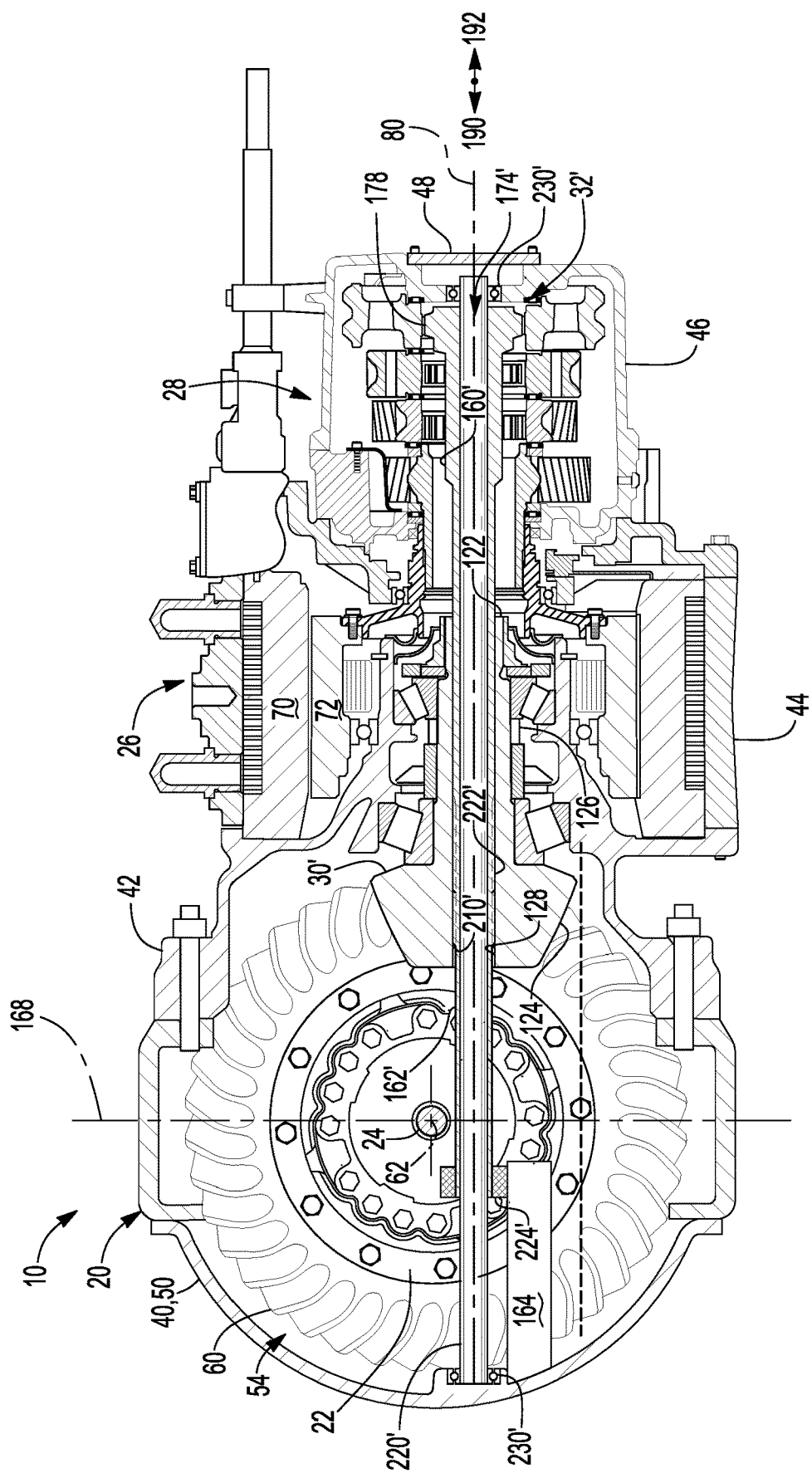
FIG. 8 is a section view of a fourth configuration of an axle assembly along section line 2-2.

Referring to FIG. 8, another configuration of an axle assembly is shown. This configuration includes housing assembly 20, a differential assembly 22, a pair of axle shafts 24, an electric motor 26, and a transmission 28 as previously described. The axle assembly also includes a drive pinion 30' and a shift mechanism 32'.

The drive pinion 30' is the same as the drive pinion 30 previously described, but may have a shorter axial length. In addition, the drive pinion 30' has a mating feature 210', which is best shown in FIG. 9, noting that FIG. 9 only shows a portion of the drive pinion 30'.

Referring primarily to FIGS. 9 and 10, the mating feature 210' is configured to rotatably couple the drive pinion 30' to a linkage 162' of the shift mechanism 32' such that the drive pinion 30' and linkage 162' are rotatable together about the axis 80. The mating feature 210' permits the linkage 162' to move along the axis 80 with respect to the drive pinion 30'. The mating feature 210' may be disposed in the drive pinion hole 128. The mating feature 210' may have any suitable configuration. For instance, the mating feature 210' may be configured with a male configuration, female configuration, or combinations thereof. As some examples, the mating feature 210' may be a pin, a key, one or more teeth, or the like. In FIG. 9, the mating feature 210' is depicted as one or more teeth, such as a spline or spline teeth that extend toward the axis 80. The mating feature 210' may be located inside the gear portion 124, the shaft portion 126, or both. In the configuration shown, the mating feature 210' is located inside the gear portion 124 of the drive pinion 30'.

Referring to FIG. 8, the shift mechanism 32' facilitates coupling of the drive pinion 30' to the transmission 28 and is configured to selectively connect a gear of the transmission 28, such as a member of the set of drive pinion gears 90, to the drive pinion 30' as previously discussed with respect to shift mechanism 32. The shift mechanism 32 includes an actuator 164 as previously discussed as well as a shift collar 160', a linkage 162', and a support shaft 220'.

Referring to FIGS. 8 and 10, the shift collar 160' is rotatable about the axis 80 with the drive pinion 30' and is moveable along the axis 80 with respect to the drive pinion 30'. The shift collar 160' may selectively connect a gear of the transmission 28, such as a member of the set of drive pinion gears 90, to the drive pinion 30' as previously discussed. In at least one configuration, the shift collar 160' is fixedly coupled to or integrally formed with the linkage 162' and includes a shift collar hole 174' as well as a shift collar gear 178 as previously described.

The shift collar hole 174' extends along the axis 80 may be configured as a through hole. The support shaft 220' may be received inside the shift collar hole 174'.

The linkage 162' extends from the shift collar 160' and operatively connects the shift collar 160' to the drive pinion 30' and the actuator 164. The linkage 162' is rotatable about the axis 80 with the shift collar 160'. The linkage 162 is received in the drive pinion hole 128 and may protrude out of the drive pinion 30' from the first end 120 and from the second end 122 of the drive pinion 30'. As such, the linkage 162' may have a greater axial length than the drive pinion 30'. In some configurations, the linkage 162' is configured as a hollow tube that extends along the axis 80. The linkage 162' may encircle the axis 80 and the support shaft 220'. In some configurations, the linkage 162' includes a linkage mating feature 222' and a shift block 224'.

The linkage mating feature 222' is configured to rotatably couple the linkage 162' to the drive pinion 30' and permit the linkage 162' to move along the axis 80 with respect to the drive pinion 30'. The linkage mating feature 222' may be disposed in the drive pinion hole 128. The linkage mating feature 222' engages the mating feature 210' of the drive pinion 30' and may have any suitable configuration that is compatible with the mating feature 210'. For instance, the linkage mating feature 222' may be configured with a male configuration, female configuration, or combinations thereof. As some examples, the linkage mating feature 222' may be a recess, pin, key, one or more teeth, or the like. In the configuration shown in FIG. 10, the linkage mating feature 222' is depicted as one or more teeth, such as a spline or spline teeth that extend away the axis 80 and that are received between corresponding teeth of the mating feature 210' of the drive pinion 30' throughout the axial travel distance of the linkage 162'. The linkage mating feature 222' may have a greater axial length than the mating feature 210' of the drive pinion 30'. The linkage mating feature 222' may be located inside the gear portion 124, the shaft portion 126, or both. In the configuration shown, at least a portion of the linkage mating feature 222' is located inside the gear portion 124 of the drive pinion 30'.

Figure 11:
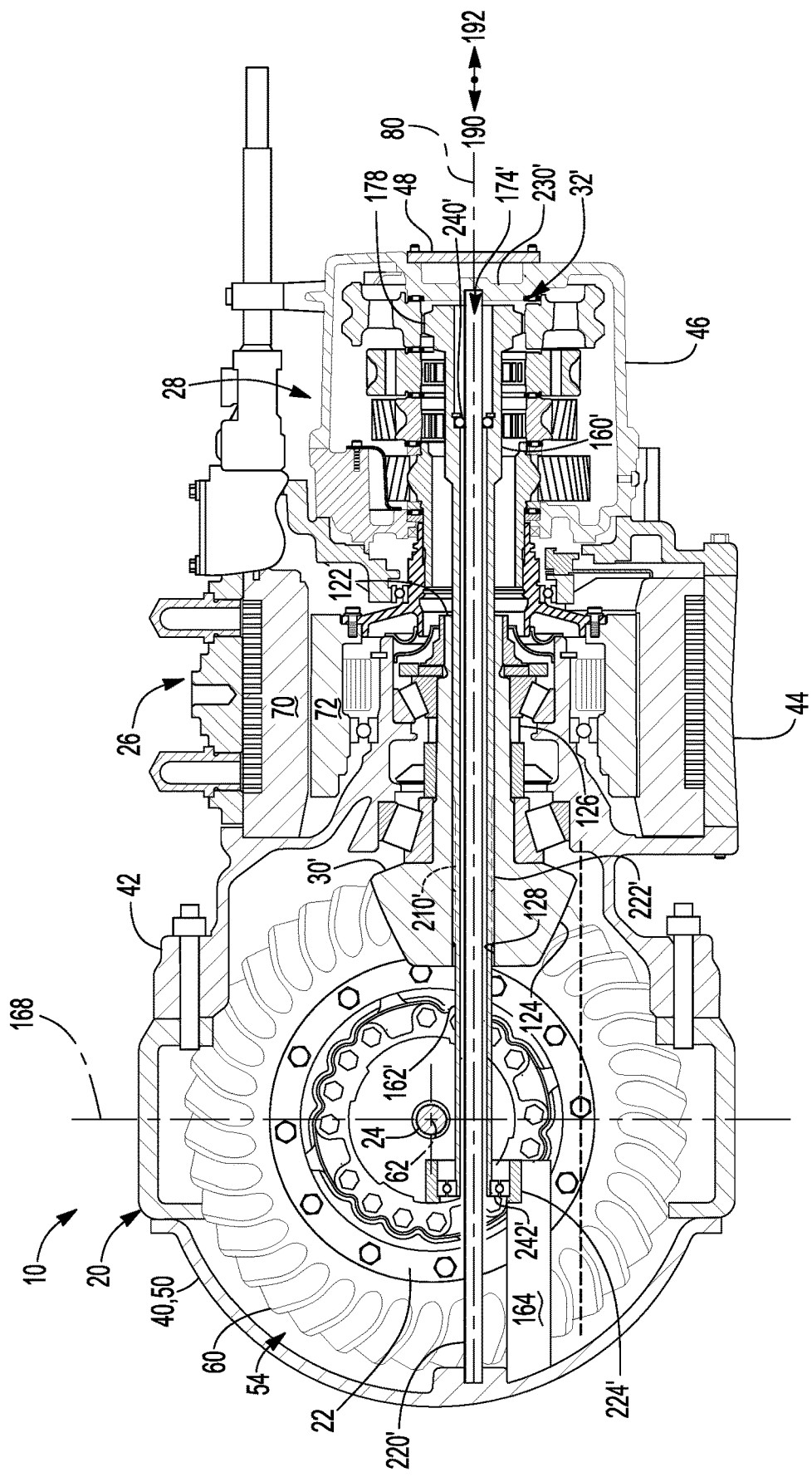
FIG. 11 is a section view of a fifth configuration of an axle assembly along section line 2-2

The shift block 224' operatively connects the linkage 162' to the actuator 164. Depending on the size of the drive pinion hole 128, the shift block 224' may be integrally formed with the linkage 162' or may be a separate component that is fastened to the linkage 162'. For instance, the shift block 224' may be a separate component that is fixedly attached to the linkage 162' after the linkage 162' is inserted through the drive pinion hole 128. The shift block 224' is disposed at or near an end of the linkage 162' that is disposed opposite the shift collar 160'. As such, the shift block 224' may be disposed inside the axle housing 40, the differential carrier 42, or both. The shift block 224' may have any suitable configuration that is compatible with the actuator 164 and the linkage 162'. In FIGS. 8 and 11, a simplified depiction of the actuator 164 is shown in which the shift block 224' is moveable along or parallel to the axis 80.

The support shaft 220' supports the shift collar 160' and the linkage 162'. The support shaft 220' extends along the axis 80 and may be encircled by the shift collar 160', the linkage 162', or both. The support shaft 220' may extend through the shift collar 160' and the linkage 162'. For instance, the support shaft 220' may protrude from an end of the shift collar 160' and protrude from an end of the linkage 162'. The ends of the support shaft 220' may be supported by the housing assembly 20.

In some configurations, such as the configuration shown in FIG. 8, the support shaft 220' is rotatable about the axis 80. In such a configuration, the support shaft 220' is rotatably supported on bearings 230', such as a roller bearing assembly. In the configuration shown, one bearing 230' is disposed on the axle housing 40 and another bearing 230' is disposed on the transmission housing 46. The support shaft 220' may not translate along the axis 80.

In some configurations, the support shaft 220' may be rotatable about the axis 80 with the shift collar 160' and the linkage 162'. In some configurations, the support shaft 220' may contact or engage the shift collar 160' and/or the linkage 162' but the shift collar 160' and the linkage 162' may be free to slide or translate along the axis 80 with respect to the support shaft 220'. For instance, the support shaft 220' may be connected to the shift collar 160' and/or the linkage 162' with one or more mating features, such as a key, pin, teeth, mating splines, or the like.

In some configurations, the support shaft 220' is not rotatable about the axis 80. An example of such a configuration is shown in FIG. 11. In this configuration, the bearings 230' may be omitted and the support shaft 220' is stationary. The shift collar 160' and the linkage 162' are rotatable about the axis 80 with respect to the support shaft 220' and moveable along the axis 80 with respect to the support shaft 220'. In some configurations, the shift collar 160' and linkage 162' may be spaced apart from the support shaft 220' such that a gap is provided therebetween.

One or more bearings 240' may be provided between the support shaft 220' and the shift collar 160' and/or the linkage 162' to facilitate rotation of the shift collar 160' and the linkage 162' with respect to the support shaft 220' and translation of the shift collar 160' and the linkage 162' along the axis 80 with respect to the support shaft 220'. For instance, a bearing 240' may include a plurality of bearing elements such as ball bearings. In FIG. 11, a single bearing 240' is shown but it is to be understood that additional bearings 240' may be provided. It is contemplated that the bearing 240' may move axially with the shift collar 160' and the linkage 162' or that the shift collar 160' and the linkage 162' may move axially with respect to the bearing 240'.

One or more bearings 242' may be provided between the support shaft 220' and the shift block 224' to facilitate rotation of the shift collar 160' and the linkage 162' with respect to the shift block 224' and translation of the shift collar 160' and the linkage 162' along the axis 80 with respect to the shift block 224'. In some configurations, the shift block 224' may encircle the bearing 242' and the bearing 242' may encircle the linkage 162' and may move axially with the linkage 162' and the shift block 224'. For instance, the linkage 162', shift block 224', and bearing 242' may be moveable along the axis 80 to the left from the position shown to move the shift collar 160' to a neutral position or to engage a different member of the set of drive pinion gears.

It is contemplated that in FIGS. 8 and 11, the actuator 164 may be disposed closer to the drive pinion 30' than is shown, such as closer to the differential axis plane 168, or between the differential axis plane 168 and the drive pinion 30' similar to the positioning shown in FIG. 2. It is also contemplated that the actuator 164 could also be disposed outside of the housing assembly 20 like the configuration shown in FIG. 7. In such a configuration, the support shaft 220' could be rotatable as in FIG. 8 or non-rotatable as in FIG. 11 and the actuator shaft or another linkage may extend from the externally mounted actuator 164 into the internal cavity 54 of the housing assembly 20 to connect the actuator 164 to the linkage 162'.

The present invention may help reduce the standout or axial length of an axle assembly. For instance, the present invention may allow a shift mechanism to be placed closer to the axle housing as compared to configurations in which the shift mechanism is positioned at the end of the axle assembly adjacent to the transmission. Positioning the shift mechanism at or near the end of the axle assembly adjacent to the transmission increases the standout or axial length of the axle assembly, increases the space required to accommodate the axle assembly when mounted on the vehicle. For instance, the present invention may reduce the axial length by approximately 60 mm in one or more configurations. In addition, positioning the shift mechanism at or near the end of the axle assembly requires that the housing assembly extend further away from the axis (e.g., in a radial direction) to provide adequate space to accommodate and package the shift mechanism. The present invention employs a hollow drive pinion that allows the shift mechanism to be moved closer to the opposite end of the axle assembly, which in turn allows an end cover to be provided that may be located both closer to the axis and that extends a shorter length along the axis.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a drive pinion that is rotatable about an axis and that has a drive pinion hole that extends along the axis from a first end of the drive pinion toward a second end of the drive pinion that is disposed opposite the first end;
   a transmission that comprises a set of gears; and
   a shift mechanism that comprises:
      a shift collar that is rotatable about the axis with the drive pinion and moveable along the axis with respect to the drive pinion;
      a linkage that is coupled to the shift collar, wherein the linkage is received in the drive pinion hole of the drive pinion; and
      an actuator that is coupled to the linkage and is configured to move the linkage and the shift collar along the axis to selectively connect a member of the set of gears to the drive pinion.

2. The axle assembly of claim 1 wherein the linkage extends along the axis.

3. The axle assembly of claim 1 wherein the linkage is rotatable about the axis with the shift collar.

4. The axle assembly of claim 1 wherein the linkage is disposed inside the shift collar.

5. The axle assembly of claim 1 wherein the linkage is fixedly coupled to the shift collar.

6. The axle assembly of claim 1 wherein the drive pinion includes a drive pinion extension that is rotatable about the axis, wherein the shift collar is disposed on the drive pinion extension and the linkage is received inside the drive pinion extension.

7. The axle assembly of claim 6 wherein the drive pinion extension has a slot that extends in an axial direction with respect to the axis, and a fastener is received in the slot and couples the linkage to the shift collar.

8. The axle assembly of claim 7 wherein the fastener is fixedly coupled to the linkage and the shift collar, and the fastener is moveable in the slot in the axial direction.

9. The axle assembly of claim 7 wherein the linkage, the fastener, and the shift collar move along the axis in a first direction when the actuator moves the shift collar toward the actuator.

10. The axle assembly of claim 9 wherein the linkage, the fastener, and the shift collar move along the axis in a second direction that is disposed opposite the first direction when the actuator moves the shift collar away from the actuator.

11. The axle assembly of claim 7 wherein the axle assembly includes an end cover that is disposed at an end of the axle assembly, wherein the end cover defines a pocket inside which a support bearing is received that rotatably supports the drive pinion, wherein the fastener is receivable in the pocket.

12. The axle assembly of claim 1 wherein the axle assembly has an electric motor that includes a rotor that is rotatable about the axis, the rotor encircles the drive pinion, and the drive pinion encircles the linkage.

13. The axle assembly of claim 1 wherein the actuator is disposed along the axis.

14. The axle assembly of claim 1 wherein the axle assembly includes an axle housing and a differential carrier that cooperate to define an internal cavity inside which a differential assembly and the actuator are received.

15. The axle assembly of claim 14 wherein the actuator is mounted to the differential carrier.

16. The axle assembly of claim 14 wherein the differential assembly is rotatable about a differential axis and the actuator is axially positioned with respect to the axis between the first end of the drive pinion and the differential axis.

17. The axle assembly of claim 14 wherein the actuator is mounted to the axle housing.

18. The axle assembly of claim 1 wherein the axle assembly includes an axle housing and a differential carrier that cooperate to define an internal cavity inside which a differential assembly and the actuator are received, the differential assembly is rotatable about a differential axis, and the actuator is positioned further from the drive pinion than the differential axis is positioned from the drive pinion.

19. The axle assembly of claim 1 wherein the axle assembly includes an axle housing and a differential carrier that cooperate to define an internal cavity inside which a differential assembly is received, wherein the actuator is disposed outside of the internal cavity.

20. The axle assembly of claim 19 wherein the actuator is mounted to the axle housing.

21. The axle assembly of claim 1 wherein the drive pinion is rotatably coupled to the linkage such that the linkage is rotatable about the axis with the drive pinion and moveable along the axis with respect to the drive pinion.

22. The axle assembly of claim 21 wherein the drive pinion is rotatably coupled to the linkage in the drive pinion hole.

23. The axle assembly of claim 22 wherein the drive pinion and the linkage are rotatably coupled with mating splines.

24. The axle assembly of claim 1 further comprising a support shaft that extends along the axis and that is encircled by the linkage and the shift collar.

25. The axle assembly of claim 24 wherein the support shaft is rotatable about the axis.

26. The axle assembly of claim 25 wherein the linkage is rotatable about the axis with the support shaft.

27. The axle assembly of claim 24 wherein the support shaft is not rotatable about the axis and the linkage is rotatable about the axis with respect to the support shaft.

\* \* \* \* \*